(12) United States Patent
Koizumi et al.

(10) Patent No.: US 7,013,243 B2
(45) Date of Patent: Mar. 14, 2006

(54) MULTIPLEXED SIGNAL QUALITY DISPLAY, METHOD, AND PROGRAM, AND RECORDED MEDIUM WHERE THE PROGRAM IS RECORDED

(75) Inventors: Satoshi Koizumi, Tokyo (JP); Juichi Nakada, Tokyo (JP); Eiji Nishino, Tokyo (JP); Hideki Ichikawa, Tokyo (JP)

(73) Assignee: Advantest Corporation, Tokyo (JP)

( * ) Notice: Subject to any disclaimer, the term of this patent is extended or adjusted under 35 U.S.C. 154(b) by 100 days.

(21) Appl. No.: 10/297,474

(22) PCT Filed: Jun. 8, 2001

(86) PCT No.: PCT/JP01/04844

§ 371 (c)(1),
(2), (4) Date: Aug. 15, 2003

(87) PCT Pub. No.: WO01/95536

PCT Pub. Date: Dec. 13, 2001

(65) Prior Publication Data

US 2004/0022182 A1    Feb. 5, 2004

(30) Foreign Application Priority Data

Jun. 9, 2000    (JP)    ............................. 2000-173484
Jun. 12, 2000   (JP)    ............................. 2000-175177

(51) Int. Cl.
H04B 17/00    (2006.01)

(52) U.S. Cl. .................. 702/189; 702/69; 702/72; 702/80; 370/320; 370/335; 370/342; 370/441; 370/508; 370/519

(58) Field of Classification Search ................ 702/691, 702/721, 801, 189; 370/320, 335, 342, 441, 370/479, 508, 519
See application file for complete search history.

(56) References Cited

U.S. PATENT DOCUMENTS

| | | | |
|---|---|---|---|
| 5,426,666 A * | 6/1995 | Kato | 375/141 |
| 6,421,369 B1 * | 7/2002 | Iwaskai et al. | 375/130 |
| 6,430,215 B1 * | 8/2002 | Kinoshita et al. | 375/147 |
| 6,545,709 B1 * | 4/2003 | Takei et al. | 348/222.1 |
| 6,650,629 B1 * | 11/2003 | Takahashi et al. | 370/335 |
| 6,701,132 B1 * | 3/2004 | Fukuzawa et al. | 455/67.16 |

FOREIGN PATENT DOCUMENTS

DE    199 55 564 A1    5/2000
DE    19955564 A1    5/2000

(Continued)

OTHER PUBLICATIONS

Tsuneo Ishibashi; CDMA wo dou Keisoku Hyouka suruka? Electronics, Mar. 1997, vol. 42, No. 3, pp. 46 to 48.

(Continued)

Primary Examiner—Carol S. W. Tsai
(74) Attorney, Agent, or Firm—Lowe Hauptman & Berner, LLP

(57) ABSTRACT

Since a multiplexed signal quality display system according to the present invention is provided with a memory means which stores measurement results obtained by measuring electric powers of signals present in all of channels within a band used and a display means which specifies a channel where the presence of a signal is predicted and which reads and displays the measured value of the specified channel, it is possible to display the waveform quality of a channel which is determined by desired Walsh code and Walsh code length.

6 Claims, 8 Drawing Sheets

FOREIGN PATENT DOCUMENTS

| | | |
|---|---|---|
| EP | 0847153 | 6/1998 |
| GB | 2 338 378 | 12/1999 |
| GB | 2338378 A * | 12/1999 |
| JP | 9-307525 A | 11/1997 |
| JP | 10-173628 | 6/1998 |
| JP | 10-173628 A | 6/1998 |
| JP | 2000-36802 A | 2/2000 |
| JP | 2000-134180 A | 5/2000 |
| JP | 2001-189711 A | 7/2001 |

OTHER PUBLICATIONS

Kiyoshi Hashiba et al; "CDMA Shingou no Hyouka Gujutsu"; Probo, (1997), No. 10, pp. 15 to 18.

English Abstract of Japanese Publication No. 10-173628.

Birgenheier R.A. "overview of code-domain power, timing, and phase measurements" Hewlett-Packard Journal, vol. 47 No. 1, (Feb. 1996) pp. 73-93.

* cited by examiner

Fig. 2

$$\begin{bmatrix} \frac{\partial \varepsilon^2}{\partial \Delta \omega} \rightarrow \\ \frac{\partial \varepsilon^2}{\partial \Delta a_n} \rightarrow \\ \frac{\partial \varepsilon^2}{\partial \Delta \tau_n} \rightarrow \\ \frac{\partial \varepsilon^2}{\partial \Delta \theta_n} \rightarrow \end{bmatrix} \begin{bmatrix} p_{(\Delta\omega\Delta\omega)} & p_{(\Delta\omega\Delta a_0)} \cdots p_{(\Delta\omega\Delta a_j)} \cdots p_{(\Delta\omega\Delta a_{63})} & p_{(\Delta\omega\Delta\tau_0)} \cdots p_{(\Delta\omega\Delta\tau_j)} \cdots p_{(\Delta\omega\Delta\tau_{63})} & p_{(\Delta\omega\Delta\theta_0)} \cdots p_{(\Delta\omega\Delta\theta_j)} \cdots p_{(\Delta\omega\Delta\theta_{63})} \\ p_{(\Delta a_0\Delta\omega)} & p_{(\Delta a_0\Delta a_0)} \cdots p_{(\Delta a_0\Delta a_j)} \cdots p_{(\Delta a_0\Delta a_{63})} & p_{(\Delta a_0\Delta\tau_0)} \cdots p_{(\Delta a_0\Delta\tau_j)} \cdots p_{(\Delta a_0\Delta\tau_{63})} & p_{(\Delta a_0\Delta\theta_0)} \cdots p_{(\Delta a_0\Delta\theta_j)} \cdots p_{(\Delta a_0\Delta\theta_{63})} \\ p_{(\Delta a_j\Delta\omega)} & p_{(\Delta a_j\Delta a_0)} \cdots p_{(\Delta a_j\Delta a_j)} \cdots p_{(\Delta a_j\Delta a_{63})} & p_{(\Delta a_j\Delta\tau_0)} \cdots p_{(\Delta a_j\Delta\tau_j)} \cdots p_{(\Delta a_j\Delta\tau_{63})} & p_{(\Delta a_j\Delta\theta_0)} \cdots p_{(\Delta a_j\Delta\theta_j)} \cdots p_{(\Delta a_j\Delta\theta_{63})} \\ p_{(\Delta a_{63}\Delta\omega)} & p_{(\Delta a_{63}\Delta a_0)} \cdots p_{(\Delta a_{63}\Delta a_j)} \cdots p_{(\Delta a_{63}\Delta a_{63})} & p_{(\Delta a_{63}\Delta\tau_0)} \cdots p_{(\Delta a_{63}\Delta\tau_j)} \cdots p_{(\Delta a_{63}\Delta\tau_{63})} & p_{(\Delta a_{63}\Delta\theta_0)} \cdots p_{(\Delta a_{63}\Delta\theta_j)} \cdots p_{(\Delta a_{63}\Delta\theta_{63})} \\ p_{(\Delta\tau_0\Delta\omega)} & p_{(\Delta\tau_0\Delta a_0)} \cdots p_{(\Delta\tau_0\Delta a_j)} \cdots p_{(\Delta\tau_0\Delta a_{63})} & p_{(\Delta\tau_0\Delta\tau_0)} \cdots p_{(\Delta\tau_0\Delta\tau_j)} \cdots p_{(\Delta\tau_0\Delta\tau_{63})} & p_{(\Delta\tau_0\Delta\theta_0)} \cdots p_{(\Delta\tau_0\Delta\theta_j)} \cdots p_{(\Delta\tau_0\Delta\theta_{63})} \\ p_{(\Delta\tau_j\Delta\omega)} & p_{(\Delta\tau_j\Delta a_0)} \cdots p_{(\Delta\tau_j\Delta a_j)} \cdots p_{(\Delta\tau_j\Delta a_{63})} & p_{(\Delta\tau_j\Delta\tau_0)} \cdots p_{(\Delta\tau_j\Delta\tau_j)} \cdots p_{(\Delta\tau_j\Delta\tau_{63})} & p_{(\Delta\tau_j\Delta\theta_0)} \cdots p_{(\Delta\tau_j\Delta\theta_j)} \cdots p_{(\Delta\tau_j\Delta\theta_{63})} \\ p_{(\Delta\tau_{63}\Delta\omega)} & p_{(\Delta\tau_{63}\Delta a_0)} \cdots p_{(\Delta\tau_{63}\Delta a_j)} \cdots p_{(\Delta\tau_{63}\Delta a_{63})} & p_{(\Delta\tau_{63}\Delta\tau_0)} \cdots p_{(\Delta\tau_{63}\Delta\tau_j)} \cdots p_{(\Delta\tau_{63}\Delta\tau_{63})} & p_{(\Delta\tau_{63}\Delta\theta_0)} \cdots p_{(\Delta\tau_{63}\Delta\theta_j)} \cdots p_{(\Delta\tau_{63}\Delta\theta_{63})} \\ p_{(\Delta\theta_0\Delta\omega)} & p_{(\Delta\theta_0\Delta a_0)} \cdots p_{(\Delta\theta_0\Delta a_j)} \cdots p_{(\Delta\theta_0\Delta a_{63})} & p_{(\Delta\theta_0\Delta\tau_0)} \cdots p_{(\Delta\theta_0\Delta\tau_j)} \cdots p_{(\Delta\theta_0\Delta\tau_{63})} & p_{(\Delta\theta_0\Delta\theta_0)} \cdots p_{(\Delta\theta_0\Delta\theta_j)} \cdots p_{(\Delta\theta_0\Delta\theta_{63})} \\ p_{(\Delta\theta_j\Delta\omega)} & p_{(\Delta\theta_j\Delta a_0)} \cdots p_{(\Delta\theta_j\Delta a_j)} \cdots p_{(\Delta\theta_j\Delta a_{63})} & p_{(\Delta\theta_j\Delta\tau_0)} \cdots p_{(\Delta\theta_j\Delta\tau_j)} \cdots p_{(\Delta\theta_j\Delta\tau_{63})} & p_{(\Delta\theta_j\Delta\theta_0)} \cdots p_{(\Delta\theta_j\Delta\theta_j)} \cdots p_{(\Delta\theta_j\Delta\theta_{63})} \\ p_{(\Delta\theta_{63}\Delta\omega)} & p_{(\Delta\theta_{63}\Delta a_0)} \cdots p_{(\Delta\theta_{63}\Delta a_j)} \cdots p_{(\Delta\theta_{63}\Delta a_{63})} & p_{(\Delta\theta_{63}\Delta\tau_0)} \cdots p_{(\Delta\theta_{63}\Delta\tau_j)} \cdots p_{(\Delta\theta_{63}\Delta\tau_{63})} & p_{(\Delta\theta_{63}\Delta\theta_0)} \cdots p_{(\Delta\theta_{63}\Delta\theta_j)} \cdots p_{(\Delta\theta_{63}\Delta\theta_{63})} \end{bmatrix} \begin{bmatrix} \Delta\omega \\ \Delta a_i \\ \Delta\tau_i \\ \Delta\theta_i \end{bmatrix} = \begin{bmatrix} p_{\Delta\omega Const.} \\ p_{\Delta a_0 Const.} \\ p_{\Delta a_j Const.} \\ p_{\Delta a_{63} Const.} \\ p_{\Delta\tau_0 Const.} \\ p_{\Delta\tau_j Const.} \\ p_{\Delta\tau_{63} Const.} \\ p_{\Delta\theta_0 Const.} \\ p_{\Delta\theta_j Const.} \\ p_{\Delta\theta_{63} Const.} \end{bmatrix}$$

Column headers: $\Delta\omega$, $\Delta a_i$, $\Delta\tau_i$, $\Delta\theta_i$

# MULTIPLEXED SIGNAL QUALITY DISPLAY, METHOD, AND PROGRAM, AND RECORDED MEDIUM WHERE THE PROGRAM IS RECORDED

FIELD OF ART

The present invention relates to displaying the waveform quality of a multiplexed signal such as CDMA signal.

BACKGROUND ART

The applicant in the present case has previously proposed such a CDMA signal waveform quality measuring method as disclosed in Japanese Patent Laid Open No. 173628/1998. FIG. 7 shows an example of power display of various channels as measured by the measuring method disclosed therein.

In FIG. 7, electric power W is plotted along the axis of ordinate, while channels CH are plotted along the axis of abscissa. In the example of FIG. 7, Walsh code length is set at "64" to permit connection of 64-channel lines, and a state is shown in which channels 0, 1, 3, 5, 7, 9, 11, 13 . . . 61, and 63 are generating signals.

In the example shown in FIG. 7 it is proposed to merely fix Walsh code length to "64" and measure the waveform quality of CDMA signal. As to Walsh length of CDMA signal presently in use in portable telephone, a standard which permits change-over to six lengths of 4, 8, 16, 63, and 128 is under consideration.

A band width is set in a transmission line by Walsh code length and a channel number is determined by Walsh code. FIG. 8 shows a relation between Walsh code length as diffusion code length and Walsh code as diffusion code. L=4, L=8, L=16, . . . shown in the left column represent Walsh lengths. At Walsh code length L=4, a predetermined band ΔF is divided into four and four channels of 0, 1, 2, 3 are allocated thereto. The channel numbers 0–3 of the four channels are given in terms of Walsh code numbers 0, 1, 2, and 3.

As is seen from FIG. 8, as Walsh code length becomes larger, the number of employable channels increases in a doubly increasing relation and an employable band width becomes narrower in decrements of ½. From this relation it will be seen that a short Walsh code length is allocated to a telephone set which handles a large volume of data to be transmitted, while a long Walsh code length is allocated to a telephone set which handles a small volume of data. In FIG. 8, Walsh code lengths 64 and 128 are omitted.

Thus, in the actual base station, a Walsh code length is selected from among six Walsh code lengths of L=4 to L=128 in accordance with the communication band width which the telephone set concerned requires, and a Walsh code not in use is selected and is used. Therefore, it is necessary to test whether all the channels in all the Walsh code lengths are in normal operation or not.

Therefore, also in the waveform quality measuring system it is necessary that the waveform quality be measured for all Walsh codes in all Walsh code lengths.

It is an object of the present invention to provide a CDMA signal waveform quality measuring system which, no matter which Walsh code length defined in the standard may be used in the issuance of CDMA signal, can determine the waveform quality of the signal.

DISCLOSURE OF THE INVENTION

The present invention as described in claim 1, is a multiplexed signal quality display system for measuring the quality of a multiplexed signal issued from a communication device wherein a band width to be used and the number of communication channels capable of being accommodated are determined by a diffusion code length, the number of communication channels and channels to be used, which are determined by a diffusion code length, are decided in terms of a diffusion code number affixed to the type of the diffusion code, to effect communication while ensuring multi-channel communication lines in one and same band, the system including: a memory unit for storing measurement results obtained by measuring electric powers of signals present in all of the channels within the band used; and a display unit which specifies a channel where the presence of a signal is predicted and reads and displays a measured value in the specified channel.

The present invention as described in claim 2, is a multiplexed signal quality display system according to claim 1, wherein the memory unit stores a phase difference or a delay difference of each the channel, and the display unit reads the phase difference or the delay difference of each the channel from the memory unit and displays it.

The present invention as described in claim 3, is a multiplexed signal quality display system according to claim 1, wherein the memory unit stores an electric power of a signal and a noise component power of the signal, and the display unit displays a graph having a length proportional to the values of the electric power of the signal and a graph having a length proportional to the value of the noise component power of the signal in such a manner that in a longitudinal direction of one of the graphs there is disposed the other graph.

The present invention as described in claim 4, is a multiplexed signal quality display system for measuring the quality of a multiplexed signal issued from a communication device wherein a band width to be used and the number of communication channels capable of being accommodated are determined by a diffusion code length, the number of communication channels and channels to be used, which are determined by a diffusion code length, are decided in terms of a diffusion code number affixed to the type of the diffusion code, to effect communication while ensuring multi-channel communication lines in one and same band, the system including: an updating unit which initializes a diffusion code length and a diffusion code number defined for each diffusion code length and which makes updating from the initialized values up to predetermined final values; a diffusion code generating unit which generates a diffusion code in accordance with the diffusion code length and diffusion code number generated by the updating unit; a demodulator unit which demodulates the signal in each the channel in accordance with the diffusion code generated by the diffusion code generating unit and the diffusion code length and the diffusion code number; a power coefficient calculator which calculates a power coefficient of the signal demodulated by the demodulator unit; a memory which stores the power coefficient of each the channel calculated by the power coefficient calculator in accordance with the diffusion code length and the diffusion code number; a setting unit which reads a power coefficient from among the power coefficients stored in the memory while specifying desired diffusion code and diffusion code number; a graphing unit which converts the power coefficient read by the setting unit into a power value, determines a length in Y-axis direction in accordance with the power value, and forms a strip-like display region; an image memory which stores image data graphed by the graphing unit; and a calculation result display unit which displays the image stored in the image memory.

The present invention as described in claim 5 is a multiplexed signal quality display method for measuring the quality of a multiplexed signal issued from a communication device wherein a band width to be used and the number of communication channels capable of being accommodated are determined by a diffusion code length, the number of communication channels and channels to be used, which are determined by a diffusion code length, are decided in terms of a diffusion code number affixed to the type of the diffusion code, to effect communication while ensuring multi-channel communication lines in one and same band, the method including: a storing step for storing measurement results obtained by measuring electric powers of signals present in all of the channels within the band used; and a display step which specifies a channel where the presence of a signal is predicted and reads and displays a measured value in the specified channel.

The present invention as described in claim 6 is a program of instructions for execution by the computer to perform a multiplexed signal quality display process for measuring the quality of a multiplexed signal issued from a communication device wherein a band width to be used and the number of communication channels capable of being accommodated are determined by a diffusion code length, the number of communication channels and channels to be used, which are determined by a diffusion code length, are decided in terms of a diffusion code number affixed to the type of the diffusion code, to effect communication while ensuring multi-channel communication lines in one and same band, the multiplexed signal quality display process including: a storing process for storing measurement results obtained by measuring electric powers of signals present in all of the channels within the band used; and a display process which specifies a channel where the presence of a signal is predicted and reads and displays a measured value in the specified channel.

The present invention as described in claim 7 is a computer-readable medium having a program of instructions for execution by the computer to perform a multiplexed signal quality display process for measuring the quality of a multiplexed signal issued from a communication device wherein a band width to be used and the number of communication channels capable of being accommodated are determined by a diffusion code length, the number of communication channels and channels to be used, which are determined by a diffusion code length, are decided in terms of a diffusion code number affixed to the type of the diffusion code, to effect communication while ensuring multi-channel communication lines in one and same band, the multiplexed signal quality display process including:

a storing process for storing measurement results obtained by measuring electric powers of signals present in all of the channels within the band used; and a display process which specifies a channel where the presence of a signal is predicted and reads and displays a measured value in the specified channel.

BRIEF DESCRIPTION OF THE DRAWINGS

FIG. 2 is a diagram showing arithmetic expressions;

BEST MODE FOR CARRYING OUT THE INVENTION

Embodiments of the present invention will be described hereinunder with reference to the accompanying drawings.

First Embodiment

Figure 1:
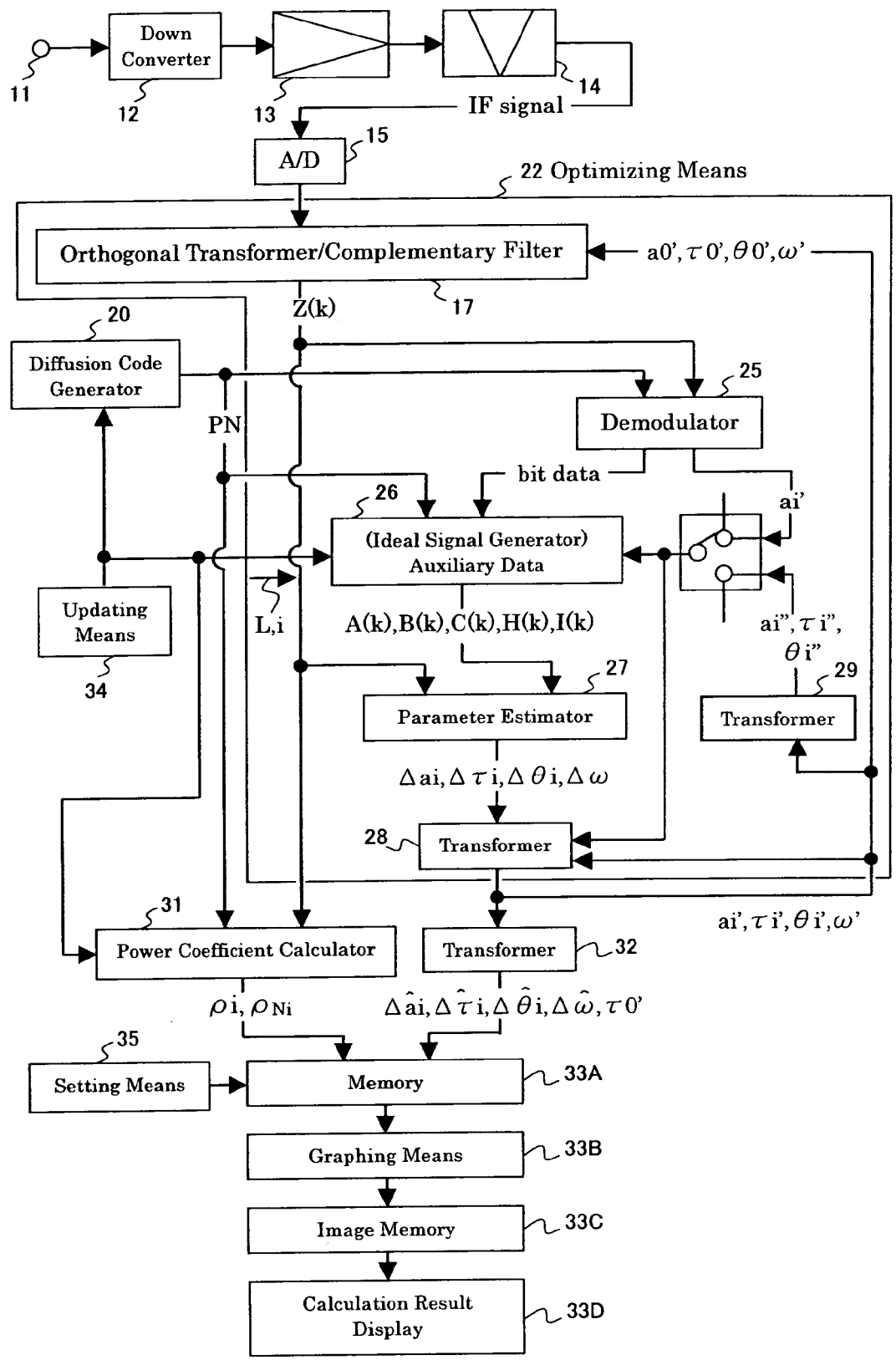
FIG. 1 is a block diagram showing the construction of a multiplexed signal waveform quality display system according to a first embodiment of the present invention.

FIG. 1 shows an example of multiplexed signal waveform quality display system according to the present invention.

In FIG. 1, a frequency-diffused, multi-channel CDMA signal from a base station is inputted through an input terminal 11 and is converted to an intermediate frequency signal by means of a down converter 12. The intermediate frequency signal is amplified by an amplifier 13, then is band-limited by a filter 14, and is thereafter converted to a digital signal by an A/D converter 15. The digital intermediate frequency signal from the A/D converter 15 is converted to a base band signal by an orthogonal transformer 17 which includes a complementary filter, affording a base band measurement signal Z(k).

The base band measurement signal Z(k) is inverse-diffused in a demodulator 25 with a diffusion code (Walsh code) provided from a diffusion code generator 20 and bit data is demodulated for each channel. At the same time, amplitude a'i (i is channel number) of each channel is detected.

In an ideal signal generator 26, an ideal signal Ri (i is channel number) is produced on the basis of both bit data provided from the demodulator 25 and diffusion code PN (Walsh code) provided from the diffusion code generator 20. Further, in accordance with the ideal signal Ri, the following expressions are calculated to generate correction data Ai(k), Bi(k), Ci(k), Ii(k), and Hi(k):

$$A_i(k) = a'_i \cdot \left[ \sum_{m=-M}^{M} a(m) \cdot R_i(k-m) \right] \cdot e^{j\theta'_i} \quad (1)$$

$$B_i(k) = \left\{ \begin{array}{l} 2a'_i \cdot \left[ \sum_{m=-M}^{M} a(m) \cdot R_i(k-m) \right] \cdot \tau'_i + \\ a'_i \cdot \left[ \sum_{m=-M}^{M} b(m) \cdot R_i(k-m) \right] \end{array} \right\} \cdot e^{j\theta'_i} \quad (2)$$

-continued $$C_i(k) = \begin{Bmatrix} a'_i \cdot \left[ \sum_{m=-M}^{M} a(m) \cdot R_i(k-m) \right] \cdot \tau_i'^2 + \\ a'_i \cdot \left[ \sum_{m=-M}^{M} b(m) \cdot R_i(k-m) \right] \cdot \tau_i' + \\ a'_i \cdot \left[ \sum_{m=-M}^{M} c(m) \cdot R_i(k-m) \right] \end{Bmatrix} \cdot e^{j\theta'_i} \quad (3)$$

$$I_i(k) = \begin{Bmatrix} \left[ \sum_{m=-M}^{M} a(m) \cdot R_i(k-m) \right] \cdot \tau_i'^2 + \\ \left[ \sum_{m=-M}^{M} b(m) \cdot R_i(k-m) \right] \cdot \tau_i' + \\ \left[ \sum_{m=-M}^{M} c(m) \cdot R_i(k-m) \right] \end{Bmatrix} \cdot e^{j\theta'_i} \quad (4)$$

$$H_i(k) = \begin{Bmatrix} 2 \cdot \left[ \sum_{m=-M}^{M} a(m) \cdot R_i(k-m) \right] \cdot \tau_i' + \\ \left[ \sum_{m=-M}^{M} b(m) \cdot R_i(k-m) \right] \end{Bmatrix} \cdot e^{j\theta'_i} \quad (5)$$

The ideal signal Ri is obtained in the following manner. Demodulated bit data of channels i provided from the demodulator 25 are inverse-diffused with I- and Q-side diffusion codes (Walsh codes) provided from the diffusion code generator 20, then chips "0" and "1" in the thus inversion-diffused I- and Q-side chip rows are converted to $+\sqrt{2}$ and $-\sqrt{2}$, respectively to afford I and Q signals of QPSK signal with an amplitude of 1. That is, using the ideal signal Ri(k−m) with a normalized amplitude and the amplitude a'i from the demodulator 25, there are calculated auxiliary data Ai(k), Bi(k), Ci(k), Ii(k), and Hi(k).

The auxiliary data Ai(k), Bi(k), Ci(k), Ii(k), and Hi(k) and the measurement signal Z(k) are inputted to a parameter estimator 27, in which simultaneous equations shown in FIG. 2 are solved and estimate values Δai, Δτi, Δθi, and Δω are obtained as solutions thereof. Using these estimate values, the correction parameters so far used a'i, τ'i, θ'i, and ω' are updated as follows in a transformer 28:

ω'←ω'+Δω a'i←a'i+Δai

τ'i←τ'i+Δτi

θ'i←θ'i+Δθi  (6)

Then, using the thus-corrected parameters a'i, τ'i, θ'i, and ω', correction is made for the measurement signal Z(k) and the thus-corrected measurement signal Z(k) is again subjected to the processings in the demodulator 25, the ideal signal/auxiliary data generator 26, the parameter estimator 27, and the transformer 28. These processings are carried out until the estimate values Δai, Δτi, Δθi, and Δω are optimized, that is, until reaching zero or near zero, or until there occurs no change of value ever with repetition. By this optimizing step, correction is made not only for the measurement signal Z(k) but also for the ideal signal Ri.

Therefore, an optimizing means 22 is constituted by the orthogonal transformer 17 which includes a complementary filter, the demodulator 25, the ideal signal generator 26, the parameter estimator 27, and the transformers 28 and 29.

Correction for the measurement signal Z(k) is made as follows relative to Z(k) of the last time:

Z(k)←Z(t−τ'0)(1/a'0)

exp [−j(ω'(t−τ'0)+θ'0)]  (7)

As initial values are set a'0=1, τ'0=0, θ'0=0, and ω'=0, and each time estimate values are obtained in the parameter estimator 27, the expression (7) is calculated with respect to new a'i, τ'i, θ'i, and ω'. That is, this calculation for correction is made for the signal inputted to the orthogonal transformer/complementary filter 17, i.e., the output of the A/D converter 15.

The calculation for correction may be performed for the measurement signal Z(k) after conversion to the base band. However, this base band-converted signal is a signal after having passed the complementary filer (the same pass band width as the band width of the input signal). If there is a gross frequency error, this filter processing may result in that a portion of the signal is removed, that is, the measurement signal to be used in parameter estimation, etc., is chipped. Therefore, the result of the frequency estimation is corrected at a stage which precedes the complementary filter. But the correction may be made for the measurement signal after conversion to the base band, provided there is used a low pass filter of a sufficiently wide band without using the complementary filter in the orthogonal transformer/complementary filter 17.

The correction parameters a'i, τ'i, and θ'i are subjected to the following conversion in the transformer 29:

a"i=a'i/a'0

τ"i=τ'i−τ'0

θ'i=θ'i−θ'0 provided i≠0  (8)

As to the measurement signal Z(k), since the parameters of the $0^{th}$ channel are corrected by the expression (7), the parameters for correcting the $0^{th}$ ideal signal $R_0$ are normalized into the following values:

a"0=1

τ"0=0

θ"0=0

The parameters for the ideal signal Ri of channels other than the $0^{th}$ channel are corrected by $0^{th}$ parameters as in the expression (8).

That is, in the first repetition in the foregoing optimization step, correction for the measurement signal Z(k) is made using the correction parameters of the $0^{th}$ channel and therefore, as correction parameters used in the auxiliary data generator 26, there is used the expression (8) normalized by the parameters of the $0^{th}$ channel, i.e., a transformed output of the transformer 29. More particularly, the calculations of the expressions (1) to (5) are performed using parameters which are conceivable in the expression (8) to determine auxiliary data Ai(k), Bi(k), Ci(k), Ii(k), and Hi(k). In this calculation for determining auxiliary data there are used bit data and amplitude a'i, the bit data being obtained as a result of demodulating Z(k) in the demodulator 25 after correction by the expression (7).

Thus, both corrections described above are performed every time estimate values are obtained from the parameter estimator 27, and the estimation of parameters is again repeated until optimization of the estimate values, whereupon a power coefficient ρi is calculated and determined as follows in a power coefficient calculator 31, using measurement signal Z(k) and diffusion code (Walsh code) obtained at that instant:

$$\rho_i = \frac{\sum_{j=1}^{N}\left|\sum_{k=1}^{64} Z_{j \cdot k} R^*_{i \cdot j \cdot k}\right|^2}{\left\{\sum_{k=1}^{64}|R_{i \cdot j \cdot k}|^2\right\}\left\{\sum_{j=1}^{N}\sum_{k=1}^{64}|Z_{j \cdot k}|^2\right\}} \quad (9)$$

The expression (9) is the same as the expression defined by the CDMA signal measurement standard and used in the prior art.

The following calculation is performed in a transformer 32:

$$a\hat{} = a'$$

$$\Delta\tau\hat{}i = \tau'i - \tau'0$$

$$\Delta\theta\hat{}i = \theta'i - \theta'0$$

$$\Delta\omega\hat{} = \omega' \quad (10)$$

The parameters $a\hat{}$, $\Delta\tau\hat{}i$, $\Delta\theta\hat{}i$, $\Delta\omega\hat{}$, $\tau0$, and the power coefficient $\rho i$ obtained in the power coefficient calculator 31 are displayed on a display 33.

As described above, the measurement signal Z(k) and the ideal signal Ri are corrected using estimated parameters, and the estimation of parameters is again performed using both corrected signals until optimization of the estimated parameters. Since all the parameters are used in this optimization, all the parameters are optimized, and after the optimization, the power coefficient $\rho i$ is determined using the measurement signal, so that the power coefficient $\rho i$ can be obtained with a high accuracy. Other parameters are also determined with a high accuracy because the measurement signal is included in the optimization loop.

The multiplexed signal waveform quality display system of the first embodiment is further provided with an updating means 34 and a memory 33A.

The updating means 34 initializes the value of Walsh code length as diffusion code length and code number of Walsh code as diffusion code and updates the values of Walsh code length and Walsh code successively from the initialized values.

While the initialized values of Walsh code length and Walsh code are updated successively by the updating means 34, there are calculated waveform quality parameters with respect to all the Walsh code lengths and Walsh codes defined by the CDMA signal standard.

The memory 33A stores the result of the calculation. The multiplexed signal waveform quality display system according to the first embodiment is further provided with a setting means 35, a graphing means 33B, an image memory 33C, and a calculation result display 33D.

Figure 3:
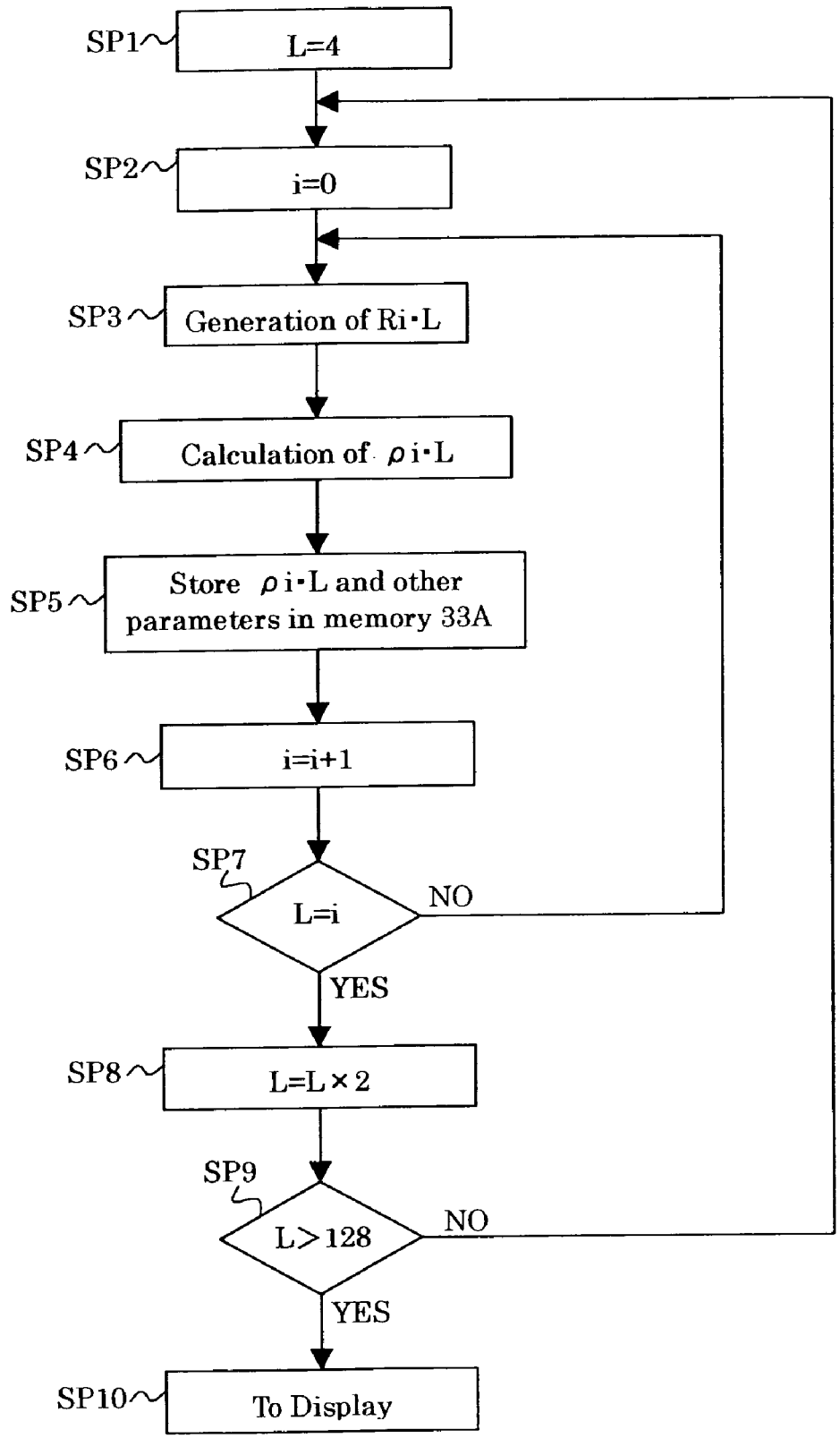
FIG. 3 is a flow chart showing the operation of an updating means 34 which executes initializing and updating operations of Walsh code length and Walsh code, and also showing in what sate arithmetic processings are performed in various components.

FIG. 3 shows the operation of the updating means 34 which executes Walsh code length, Walsh code initializing and updating operations, and also shows in what state arithmetic processings are performed in various components.

In step SP1, Walsh code length is initialized at L=4. In step SP2, the number assigned to Walsh code (corresponding to channel number) is set at i=0.

In step SP3, an ideal signal Ri·L based on Walsh code length L=4 and Walsh code i=0 is produced in the ideal signal generator 26.

In step SP4, parameters are estimated in the parameter estimator 27 in accordance with the ideal signal Ri·L and are then fed back to the orthogonal transformer 17 for optimization processing. Then, the power coefficient $\rho i \cdot L$ is calculated on the basis of the measurement signal Z(k) after optimization processing and the diffusion code.

In step SP5, the power coefficient $\rho i \cdot L$ calculated in step SP4 and other parameters 'ai·L, $\Delta'\tau i \cdot L$, $\Delta'\theta i \cdot L$, $\Delta'\omega$, $\tau 0'$ are stored in the memory 33A.

In step SP6, the value of Walsh code i is updated as i+1, then in step SP7, the value of Walsh code length L and that of Walsh code i are compared with each other. If both disagree, the processing flow returns to step SP3. That is, in case of Walsh code length L=4, i=4 results from executing the steps SP3–SP7 four times, and the flow advances to step SP8.

In step SP8, the value L of Walsh code length is doubled for updating to L=8. In step SP9, a check is made to see if the value L of Walsh code length has become larger than the maximum value 128. If the answer is affirmative, the flow returns to step SP2.

In step SP2, initialization is made again to i=0 and the routine of steps SP3–SP7 is executed. With L=8, the routine of steps SP3–SP7 is executed eight times. In this eight-time execution, power coefficients $\rho i \cdot L$ and parameters $\hat{}ai \cdot L$, $\Delta\tau\hat{}i \cdot L$, $\Delta\theta\hat{}i \cdot L$, $\Delta\hat{}\omega$, $\tau 0'$ for eight channels of 0–7 defined for Walsh code length of L=8 are calculated and are stored in the memory 33A.

In this way the Walsh code length L is updated in the order of 4, 8, 16, 32, 64, and 128, and power coefficient $\rho i \cdot L$ and parameters $\hat{}ai \cdot L$, $\Delta\tau\hat{}i \cdot L$, $\Delta\theta\hat{}i \cdot L$, $\Delta\hat{}\omega$, $\tau 0'$ are stored in the memory 33A for each channel determined by each Walsh code length L.

If it is detected in step SP9 that the value L of Walsh code length has exceeded the maximum value of 128, the processing flow branches to step SP10.

In step SP10, an electric power of each channel is calculated from, for example, power coefficient $\rho i$ included in the measurement results of each channel and in accordance with an address which is determined by a desired to-be-displayed channel number set in the setting means 35, and this power value is inputted to the graphing means 33B. The graphing means 33B determines the height of a bar graph to be displayed at the display position of each channel correspondingly to the power value of each channel, and causes image data of the bar graph to be stored in the image memory 33C. The calculation result display 33D reads the bar graph data from the image memory 33C and displays the bar graph.

Power W can be calculated as follows from the power coefficient $\rho i \cdot L$:

$$W = 10.0 \times \log_{10}(\rho i \cdot L)$$

This calculation can be done in the graphing means 33B for example.

Figure 4:
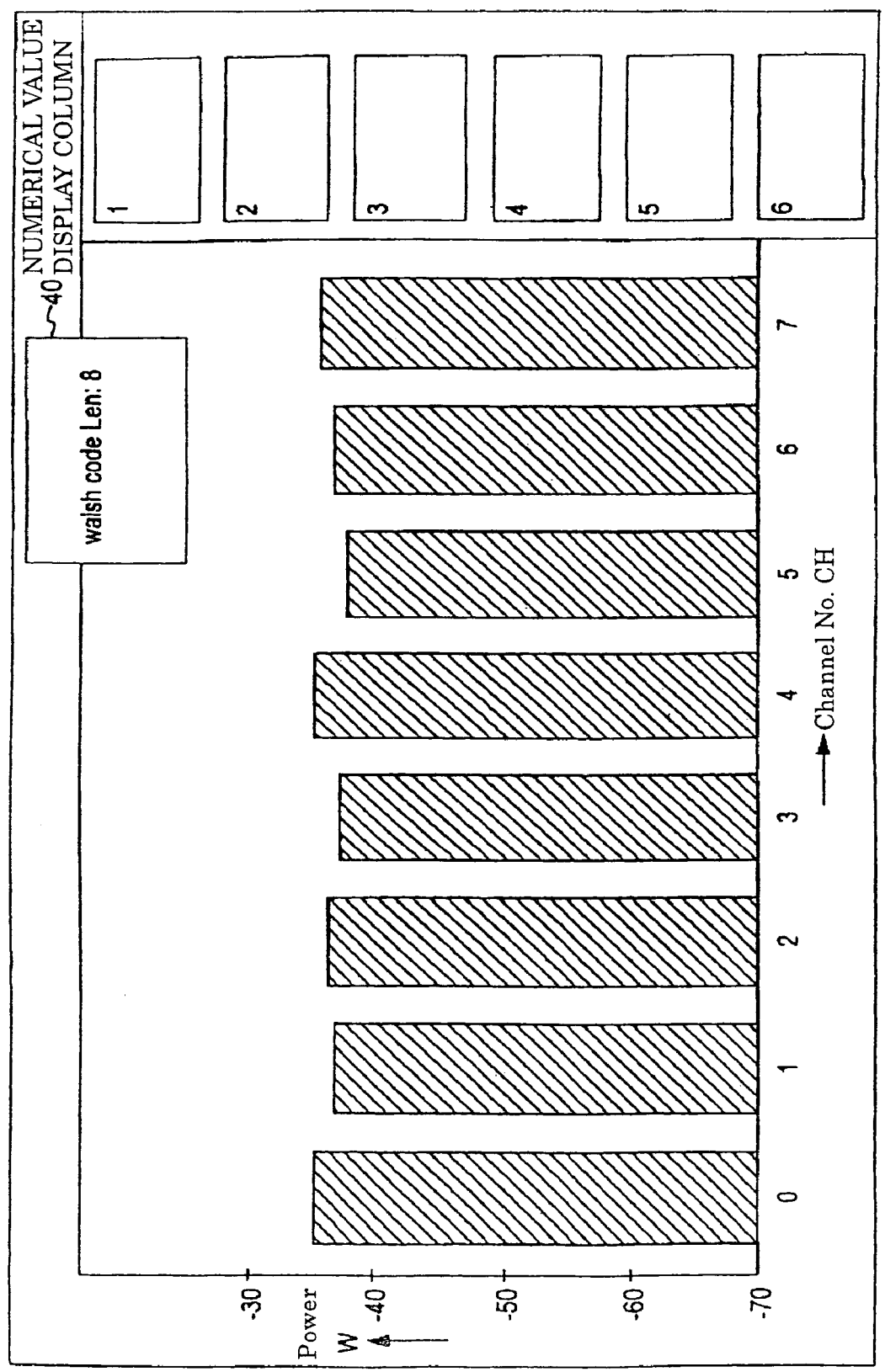
FIG. 4 is a diagram showing a display screen in the first embodiment.

For example, therefore, if i=0, 1, 2, ... 7 are set at Walsh code length L=8 and the operation mode is set to a mode of displaying electric powers of signals present in 0–7 channels, it is possible to display the electric power W of CDMA signal present on each of eight-channel transmission lines, as shown in FIG. 4.

At this time, it is necessary that Walsh code length L be sure to be known as L=8 with respect to the signal to be measured. Thus, the value of Walsh code length L and the channel which outputs the signal are known in advance, so by setting the known value in the setting means 35 and if a spectrum which reflects it as it is, it can be judged that the base station is operating normally.

Figure 5:
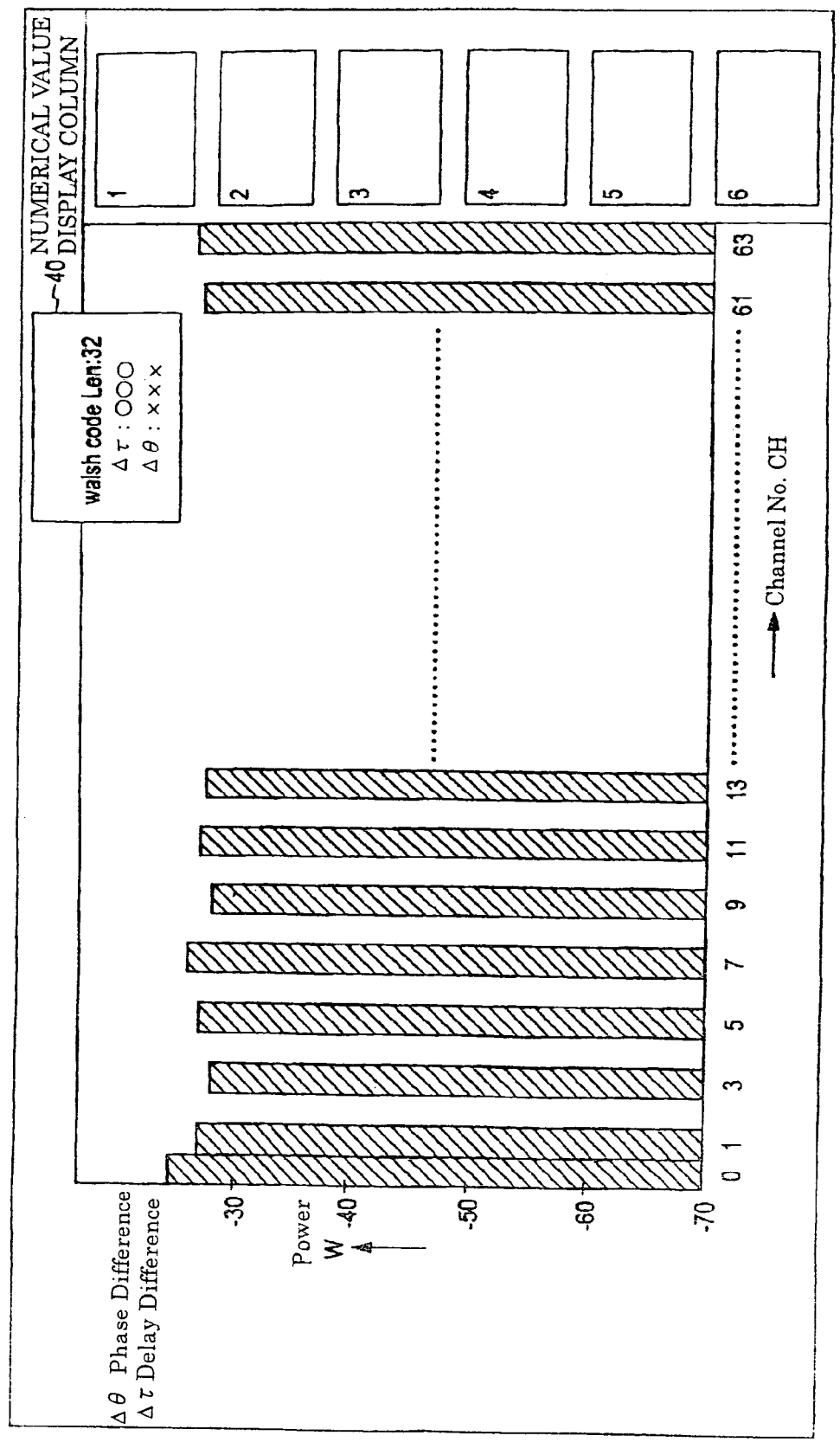
FIG. 5 is a diagram showing a display screen according to a modification in the first embodiment.

As shown in FIG. 4, Walsh code length (L=8) is displayed in a numerical value display column 40. Parameters Δτ and Δθ (or Δτ^ and Δθ^) may be displayed in the numerical value display column 40, as shown in FIG. 5. The parameters Δτ and Δτ^ stand for a delay difference of each channel, while the parameters Δθ and Δθ^ stand for a phase difference of each channel.

Although in the example shown in FIG. 5 electric power W is displayed along the axis of ordinate, parameters Δτ and Δθ (or Δτ^and Δθ^) may be displayed along the axis of ordinate.

Second Embodiment

This second embodiment is different from the first embodiment in point of displaying a noise power component. A description will be given below only about the different point.

Noise power coefficient $\rho_{Ni}$ (code Domain Error) is calculated as follows by the power coefficient calculator 31 using $Z_j·k$ and $Ri·j·k$ in the expression (9).

The sum of channels in the ideal signal Ri is subtracted from the measurement signal Z to obtain an error signal N, and a power coefficient is determined as follows with respect to the error signal N:

$$N_{i·k} = Z_{j·k} - \sum_{i}^{L-1} R_{i·j·k}$$

$$\rho_{Ni} = \frac{\sum_{j=1}^{(M/L)} \left|\sum_{k=1}^{L} N_{j·k} \times R^*_{i·j·k}\right|^2}{\left\{\sum_{k=1}^{L} |R_{i·j·k}|^2\right\}\left\{\sum_{j=1}^{(M/L)} \cdot \sum_{k=1}^{L} |Z_{j·k}|^2\right\}}$$

Noise power $W_N$ of i channel is calculated as follows:

$W_N = 10.0 \times \log_{10}(\rho_{Ni})$

The result of the calculation is stored in the memory 33A in a pair with the signal power $W_S$ channel by channel. The values of signal power $W_S$ and noise power $W_N$ in each channel are graphed by a graph plotting means (included in the calculation result display 33) and written as a graph in an image memory. The values of signal power $W_S$ and noise power $W_N$ in all the channels are all stored in the image memory, whereby the states of all the channels are displayed on the display.

Figure 6:
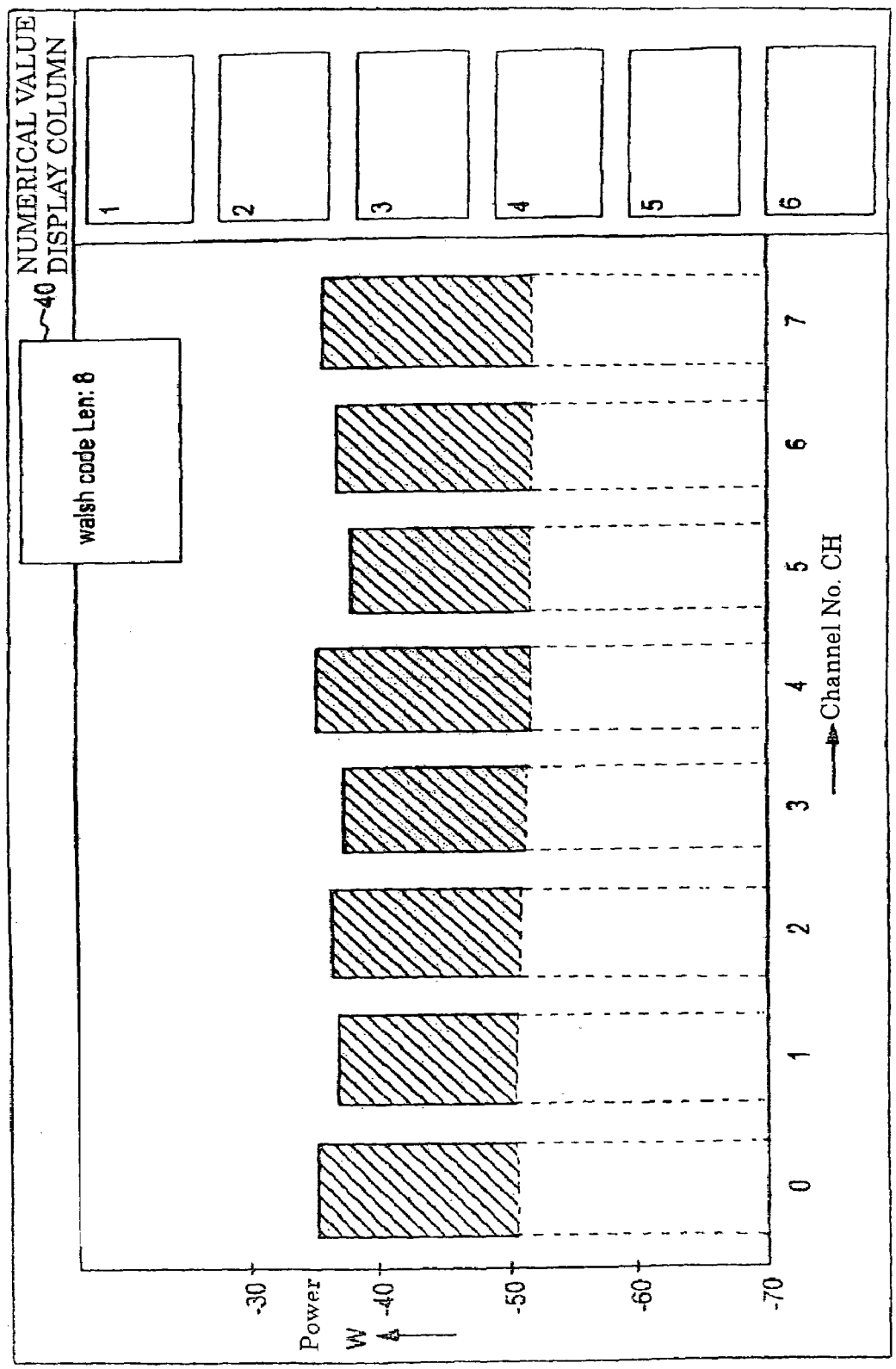
FIG. 6 is a diagram showing a display screen according to a modification in a second embodiment of the present invention.
Figure 7:
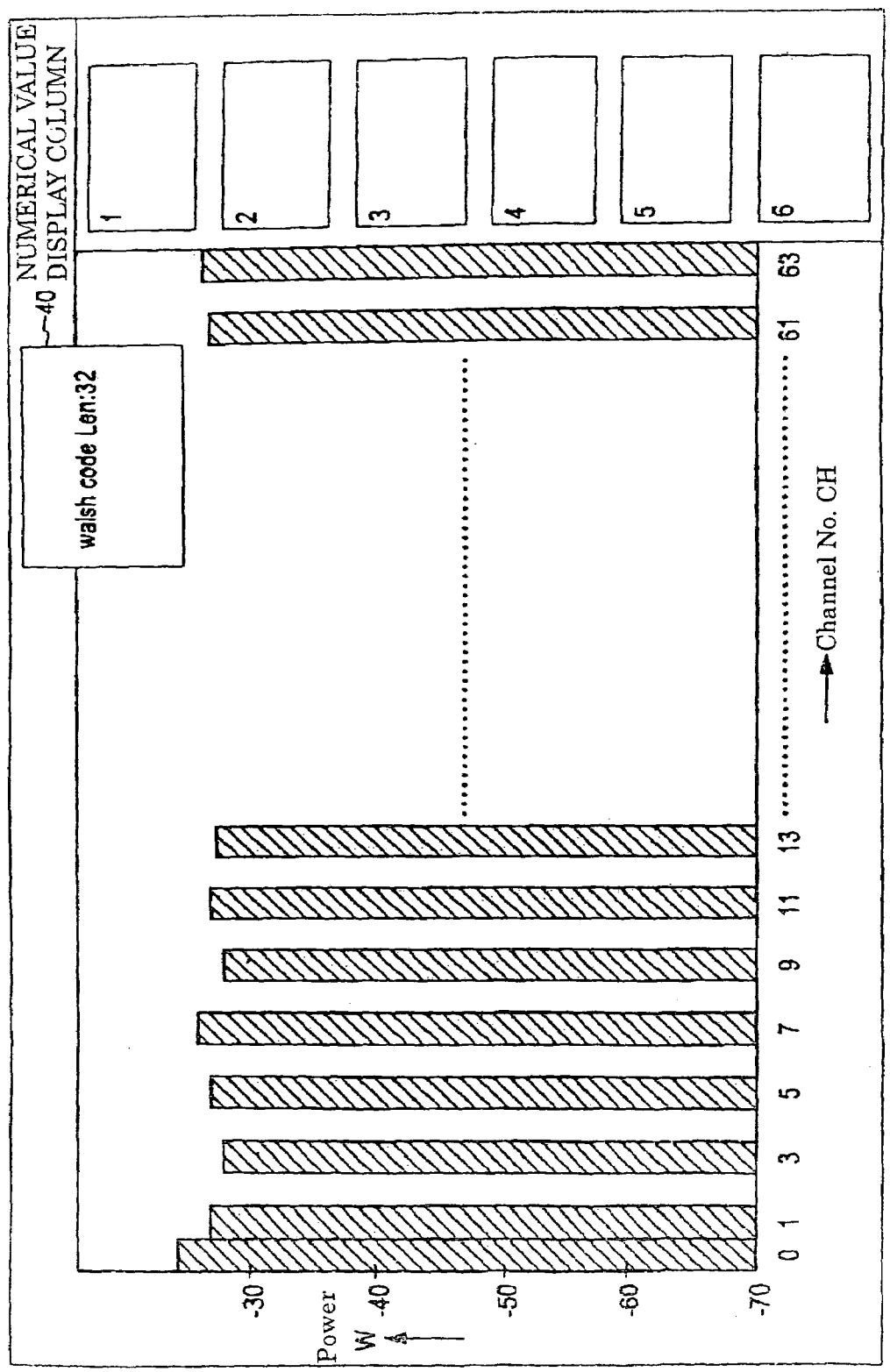
FIG. 7 is a diagram showing a conventional display screen.
Figure 8:
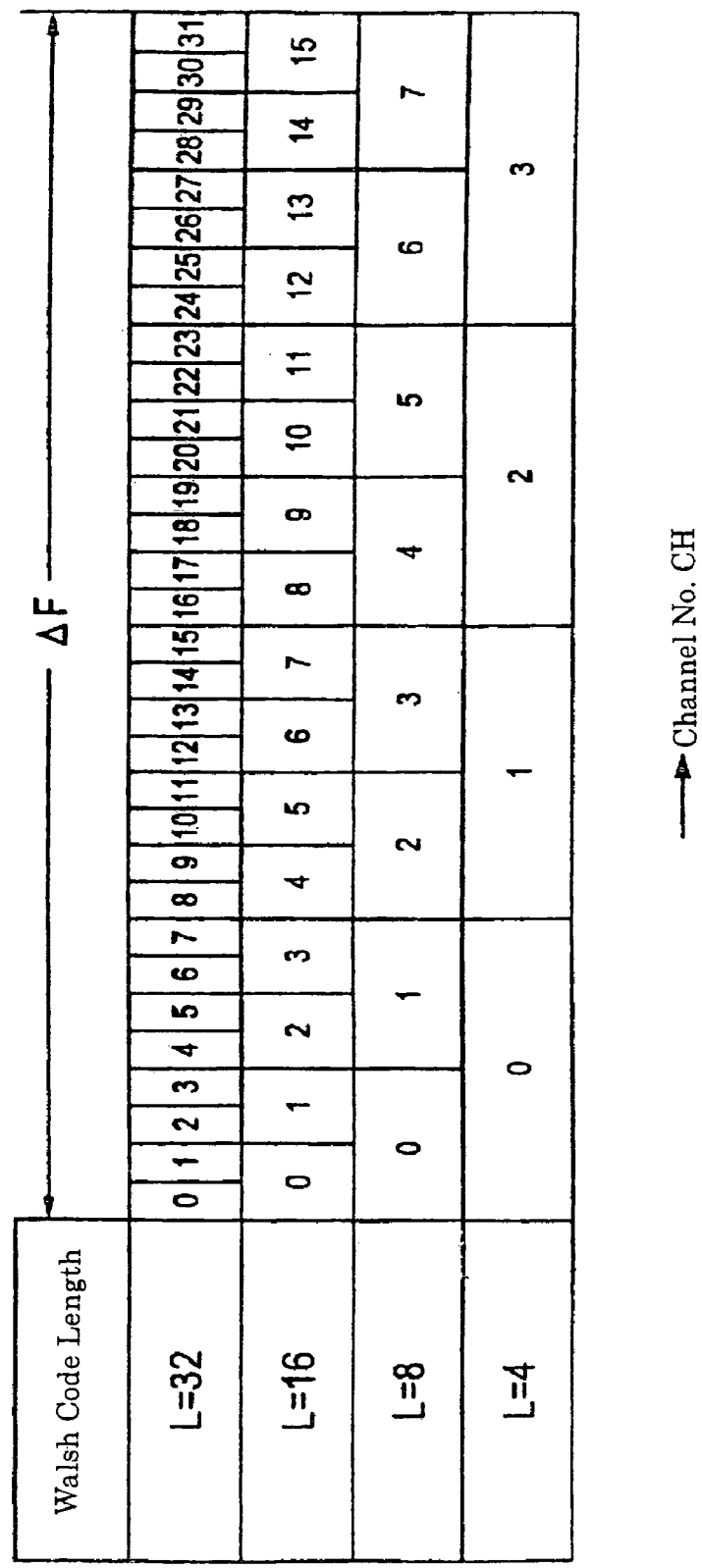
FIG. 8 is a diagram showing a relation between Walsh code length as diffusion code length and Walsh code as diffusion code in the prior art.

FIG. 6 shows an example of the plotting. In the same figure, hatched portions (graphs) with solid lines represent signal powers $W_S$ of the channels, while dotted line portions (graphs) represent noise powers $W_N$ of the channels. The height (length) of each graph represents the signal power $W_S$ and noise power $W_N$ of each channel. The graphs of noise power $W_N$ underlie vertical (longitudinal) extension lines of the graphs of signal power $W_S$.

According to the present invention, as set forth above, the measurement of waveform quality is conducted with respect to all the channels defined by the CDMA signal standard and the results of the measurement are stored in the memory 33A, so that by setting in the setting means 35 both Walsh code length and Walsh code given as known values from among the stored values for which a signal is being issued at present, then by reading a power coefficient specified by the setting means 35, as well as parameters, and inputting the thus-read power coefficient and parameters to the calculation result display 33D, it is possible to display the waveform quality of the channel which is determined by desired Walsh code length and Walsh code.

Thus, by using the system of the invention in case of adjusting, for example, a base station for portable telephone to be tested, there can be obtained an advantage that the time and labor required for the adjustment can be greatly reduced.

What is claimed is:

1. A multiplexed signal quality display system for measuring the quality of a multiplexed signal issued from a communication device wherein a band width to be used and the number of communication channels capable of being accommodated are determined by a diffusion code length, the number of communication channels and channels to be used, which are determined by a diffusion code length, are decided in terms of a diffusion code number affixed to the type of the diffusion code, to effect communication while ensuring multi-channel communication lines in one and same band, said system comprising:
   a memory means for storing measurement results obtained by measuring electric powers of signals present in all of the channels within the band used; and
   a display means which specifies a channel where the presence of a signal is predicted and reads and displays a measured value in the specified channel;
   wherein said memory means stores an electric power of a signal and a noise component power of the signal, and said display means displays a graph having a length proportional to the values of said electric power of the signal and a graph having a length proportional to the value of said noise component power of the signal in such a manner that in a longitudinal direction of one of said graphs there is disposed the other graph.

2. A multiplexed signal quality display system according to claim 1, wherein said memory means stores a phase difference or a delay difference of each said channel, and said display means reads the phase difference or the delay difference of each said channel from said memory means and displays it.

3. A multiplexed signal quality display system for measuring the quality of a multiplexed signal issued from a communication device wherein a band width to be used and the number of communication channels capable of being accommodated are determined by a diffusion code length, the number of communication channels and channels to be used, which are determined by a diffusion code length, are decided in terms of a diffusion code number affixed to the type of the diffusion code, to effect communication while ensuring multi-channel communication lines in one and same band, said system comprising: an updating means which initializes a diffusion code length and a diffusion code number defined for each diffusion code length and which makes updating from the initialized values up to predetermined final values; a diffusion code generating means which generates a diffusion code in accordance with the diffusion code length and diffusion code number generated by said updating means; a demodulator means which demodulates the signal in each said channel in accordance with the diffusion code generated by said diffusion code generating means and said diffusion code length and said diffusion code number; a power coefficient calculator which calculates a power coefficient of the signal demodulated by said demodulator means; a memory which stores the power coefficient of each said channel calculated by said power coefficient calculator in accordance with the diffusion code length and the diffusion code number; a setting means which reads a power coefficient from among the power coefficients stored in said memory while specifying desired diffusion code and diffusion code number; a graphing means which converts the power coefficient read by said setting means into a power value, determines a length in Y-axis direction in accordance with said power value, and forms a strip-like display region; an image memory which stores image data graphed by said graphing means; and a calculation result display means which displays the image stored in said image memory.

4. A multiplexed signal quality display method for measuring the quality of a multiplexed signal issued from a communication device wherein a band width to be used and the number of communication channels capable of being accommodated are determined by a diffusion code length, the number of communication channels and channels to be used, which are determined by a diffusion code length, are decided in terms of a diffusion code number affixed to the type of the diffusion code, to effect communication while ensuring multi-channel communication lines in one and same band, said method comprising: a storing step for storing measurement results obtained by measuring electric powers of signals present in all of the channels within the band used; and a display step which specifies a channel where the presence of a signal is predicted and reads and displays a measured value in the specified channel, wherein said storing step stores an electric power of a signal and a noise component power of the signal, and said display step displays a graph having a length proportional to the values of said electric power of the signal and a graph having a length proportional to the value of said noise component power of the signal in such a manner that in a longitudinal direction of one of said graphs there is disposed the other graph.

5. A program of instructions for execution by the computer to perform a multiplexed signal quality display process for measuring the quality of a multiplexed signal issued from a communication device wherein a band width to be used and the number of communication channels capable of being accommodated are determined by a diffusion code length, the number of communication channels and channels to be used, which are determined by a diffusion code length, are decided in terms of a diffusion code number affixed to the type of the diffusion code, to effect communication while ensuring multi-channel communication lines in one and same band, said multiplexed signal quality display process comprising:

a storing process for storing measurement results obtained by measuring electric powers of signals present in all of the channels within the band used; and a display process which specifies a channel where the presence of a signal is predicted and reads and displays a measured value in the specified channel;

wherein said storing process stores an electric power of a signal and a noise component power of the signal, and said display process displays a graph having a length proportional to the values of said electric power of the signal and a graph having a length proportional to the value of said noise component power of the signal in such a manner that in a longitudinal direction of one of said graphs there is disposed the other graph.

6. A computer-readable medium having a program of instructions for execution by the computer to perform a multiplexed signal quality display process for measuring the quality of a multiplexed signal issued from a communication device wherein a band width to be used and the number of communication channels capable of being accommodated are determined by a diffusion code length, the number of communication channels and channels to be used, which are determined by a diffusion code length, are decided in terms of a diffusion code number affixed to the type of the diffusion code, to effect communication while ensuring multi-channel communication lines in one and same band, said multiplexed signal quality display process comprising: a storing process for storing measurement results obtained by measuring electric powers of signals present in all of the channels within the band used; and a display process which specifies a channel where the presence of a signal is predicted and reads and displays a measured value in the specified channel;

wherein said storing process stores an electric power of a signal and a noise component power of the signal, and said display process displays a graph having a length proportional to the values of said electric power of the signal and a graph having a length proportional to the value of said noise component power of the signal in such a manner that in a longitudinal direction of one of said graphs there is disposed the other graph.

* * * * *